United States Patent
Kikkawa et al.

(10) Patent No.: US 8,898,311 B2
(45) Date of Patent: Nov. 25, 2014

(54) DATA COMMUNICATION METHOD AND INFORMATION PROCESSING DEVICE

(75) Inventors: Norifumi Kikkawa, Tokyo (JP); Atsushi Onoe, Kanagawa (JP); Yuichi Kageyama, Tokyo (JP)

(73) Assignee: Sony Corporation, Tokyo (JP)

( * ) Notice: Subject to any disclaimer, the term of this patent is extended or adjusted under 35 U.S.C. 154(b) by 110 days.

(21) Appl. No.: 13/277,855

(22) Filed: Oct. 20, 2011

(65) Prior Publication Data

US 2012/0110194 A1    May 3, 2012

(30) Foreign Application Priority Data

Oct. 27, 2010  (JP) ................ P2010-240691

(51) Int. Cl.
*G06F 15/16*  (2006.01)
*H04L 29/06*  (2006.01)

(52) U.S. Cl.
CPC ............. *H04L 69/14* (2013.01); *H04L 69/163* (2013.01)
USPC ...................................................... 709/227

(58) Field of Classification Search
USPC ...................................................... 709/227
See application file for complete search history.

(56) References Cited

U.S. PATENT DOCUMENTS

| | | | |
|---|---|---|---|
| 2003/0208600 A1* | 11/2003 | Cousins ................ | 709/227 |
| 2004/0131059 A1* | 7/2004 | Ayyakad et al. ......... | 370/389 |
| 2008/0130658 A1* | 6/2008 | Chakareski et al. ..... | 370/395.42 |
| 2008/0291833 A1* | 11/2008 | Vos et al. .............. | 370/237 |
| 2011/0238789 A1* | 9/2011 | Luby et al. ............. | 709/219 |

FOREIGN PATENT DOCUMENTS

JP    2005-057482    3/2005

* cited by examiner

*Primary Examiner* — Khanh Dinh
*Assistant Examiner* — S M Rahman
(74) *Attorney, Agent, or Firm* — Sony Corporation

(57) ABSTRACT

Provided is a data communication method of establishing a plurality of TCP (Transmission Control Protocol) connections between a first information processing device and a second information processing device and communicating each piece of data, which is divided for each prescribed unit, through the plurality of established TCP connections. In the method, the first information processing device dynamically changes the number of TCP connections with the second information processing device by notifying connection-upper-limit information, which represents the upper limit of the number of TCP connections to be established with the second information processing device, to the second information processing device, and by changing the connection-upper-limit information to be notified.

10 Claims, 11 Drawing Sheets

DATA COMMUNICATION METHOD AND INFORMATION PROCESSING DEVICE

BACKGROUND

The present disclosure relates to a data communication method and an information processing device capable of establishing a plurality of TCP (Transmission Control Protocol) connections between a server device and a client device and communicating each piece of data, which is divided for each prescribed unit, through the plurality of TCP connections.

In the related art, there is a widely used method of communicating web pages and contents from the service on the Internet through HTTP (HyperText Transfer Protocol). For example, it is possible to perform download (GET) or upload (PUT) of data through HTTP.

Generally, HTTP is performed on a single TCP. The TCP is a transport capable of asynchronous bidirectional communication. In HTTP, an information processing device as a client and an information processing device as a server interchange the requests for the download (GET) or the upload (PUT) of the data or the replies to the requests through a single TCP connection. Specifically, the client transmits the upload request (PUT request), and then transmits the data to be uploaded subsequently to the PUT request. On the other hand, when the client transmits the download request (GET request), the server transmits the reply to the GET request, and transmits the data which is downloaded subsequently to the reply.

Here, the throughput per one TCP under the environment, which is a sufficiently large bandwidth and in which delay is large, depends on the method of the flow control of the TCP. Here, the maximum throughput is obtained by the receive buffer size per socket/RTT (Round Trip Time, the time necessary for the round trip of a packet). When the maximum throughput of the TCP is limited by the above factors, under the environment which is a sufficiently large bandwidth and in which delay is large, there is a concern that the original ability of the link is not sufficiently exhibited.

For this reason, there has been proposed SPDY which is a standard as a communication protocol of the Internet contents in replacement of HTTP (for example, refer to the online document "SPDY" on the Internet <URL: http://www.chromium.org/spdy> (Searched on Oct. 18, 2010)). In SPDY, there is an improvement in that it is possible to efficiently transmit various contents of the Internet even one TCP by changing the layer of HTTP. SPDY provides a clue to solve problems caused by HTTP (for example, it is necessary to complete the communication of the data in sequence of the requests, and so on) and a clue to enable a browser to perform efficient pre-reading.

Further, there has been proposed a method of transmitting data in parallel through HTTP by using the plurality of TCP connections (for example, refer to Japanese Unexamined Patent Application Publication No. 2005-57482).

SUMMARY

However, the pre-reading is effective only in context in which the pre-reading is possible, and in many situations, it is difficult to perform the pre-reading. In the description of the online document "SPDY" on the Internet <URL: http://www.chromium.org/spdy> (Searched on Oct. 18, 2010)), it is difficult to transmit the data which is larger than the upper limit of the throughput of the TCP.

Further, in Japanese Unexamined Patent Application Publication No. 2005-57482, it is assumed that the data stream which is simultaneously sent is single. Thus, it is difficult to process a plurality of requests at the same time and change the sequence thereof. Further, since the number of TCP connections is constant, it is difficult to dynamically limit the resource and cope with environmental changes. Further, in Japanese Unexamined Patent Application Publication No. 2005-57482, recovery of the data is not considered when the TCP is disconnected.

In consideration of the above situations, it is desirable to provide a data communication method and an information processing device capable of increasing the speed of data communication based on HTTP.

According to an embodiment of the disclosure, provided is a data communication method of establishing a plurality of TCP (Transmission Control Protocol) connections between a first information processing device and a second information processing device and communicating each piece of data, which is divided for each prescribed unit, through the plurality of established TCP connections.

The first information processing device dynamically changes the number of TCP connections with the second information processing device by notifying connection-upper-limit information, which represents the upper limit of the number of TCP connections to be established with the second information processing device, to the second information processing device, and by changing the connection-upper-limit information to be notified.

According to the embodiment of the disclosure, by dynamically increasing or decreasing the number of TCP connections, it is possible to control the throughputs. The dynamic control on the number of TCP connections is advantageous, for example, in the following case. In a case where the single first information processing device (a server device) and a plurality of the second information processing devices (client devices) perform communication around the same time, due to the limitation of the processing capability of the first information processing device, the throughput, which can be provided per one second information processing device, is limited. When the number of second information processing devices increases, by lowering the throughputs to the connected second information processing devices, it is possible to make them equivalent to the throughputs to new second information processing devices. Thereby, it is possible to equally perform services among the plurality of second information processing devices.

It is preferable that the first information processing device should sequentially update command sequence information in accordance with the change of the connection-upper-limit information, and should transmit the information to the second information processing device.

It is preferable that the second information processing device should recognize the latest connection-upper-limit information from the first information processing device on the basis of the received command sequence information.

When the plurality of pieces of the different connection-upper-limit information transmitted by the first information processing device arrive at the second information processing devices through different TCP connections, the sequence of arrival of the plurality of pieces of the connection-upper-limit information is likely to be different from the sequence of transmission thereof. In this case, even when the latest connection-upper-limit information subsequently transmitted arrives earlier than the connection-upper-limit information previously transmitted, the second information processing device is able to recognize the notification of the latest connection-upper-limit information on the basis of the command sequence information.

It is preferable that the first information processing device should add the connection-upper-limit information and the command sequence information to a header of each piece of the divided data, and should transmit the information to the second information processing device.

When the connection-upper-limit information and the command sequence information is added to the header, the first information processing device is not necessary to transmit the request to notify the connection-upper-limit information to the second information processing device, separately from the divided data. Further, the second information processing device is able to directly recognize the update of the connection information with reference to the headers of the pieces of the divided data received as necessary.

It is preferable that the second information processing device should transmit a transmission request, which includes data specification information for specifying the data, to the first information processing device.

It is preferable that the first information processing device should divide the data, which is specified by the data specification information included in the received transmission request, into pieces for each prescribed unit, should add the data specification information to the header of each piece of the divided data, and should transmit the data to the second information processing device.

The second information processing device is able to recover the data for each piece of the divided data having the same data specification information regardless of the sequence of reception of the pieces of the divided data with reference to the data specification information added to the header of each piece of the divided data. For example, when downloading a plurality of pieces of data, the second information processing device is likely to receive the data pieces into which one data is divided and the data pieces into which the other data is divided in the sequence that they are mixed. Even in this case, the second information processing device is able to recover the plurality of pieces of data for each piece of the divided data having the same data specification information with reference to the data specification information for specifying each piece of the data.

It is preferable that the first information processing device should further add context-identification information for identifying context of the data, which is not divided, to the header of each piece of the divided data.

Thereby, regardless of the sequence that the pieces of the divided data are received, the second information processing device is able to recover the data in the correct sequence with reference to the context-identification information.

According to another embodiment of the disclosure, an information processing device includes a network connection section, which is able to connect to the network, and change means.

When a plurality of TCP (Transmission Control Protocol) connections with different information processing are established through the network connection section and each piece of data which is divided for each prescribed unit is communicated through the plurality of established TCP connections, the change means dynamically changes the number of TCP connections with the different information processing by notifying connection-upper-limit information, which represents the upper limit of the number of TCP connections to be established with the different information processing, to the different information processing, and by changing the connection-upper-limit information to be notified.

According to the embodiments of the disclosure, it is possible to increase a speed of the data communication based on HTTP.

DETAILED DESCRIPTION OF EMBODIMENTS

Figure 1:
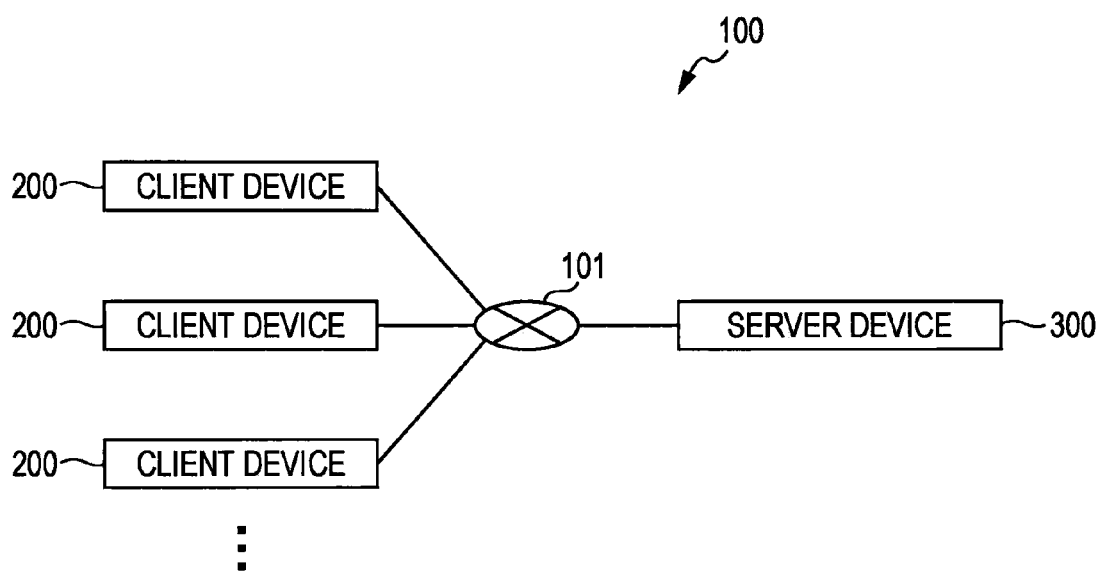
FIG. 1 is a diagram illustrating a configuration of a data communication system according to an embodiment of the present disclosure.

Hereinafter, embodiments of the disclosure will be described with reference to the accompanying drawings.
Configuration of Data Communication System FIG. 1 is a diagram illustrating a configuration of a data communication system according to an embodiment of the present disclosure.

The information processing system 100 has one or more client devices 200 and a server device 300. The client device 200 and the server device 300 are connected to communicate with each other through a global network 101. It should be noted that only one client device 200 of the plurality of client devices 200 will be hereinafter described.

Each of the client device 200 and the server device 300 is configured to include an information processing device such as a PC (Personal Computer), and is able to communicate data through HTTP by using the TCP connection.

For example, the client device 200 transmits a data upload request (hereinafter referred to as an "HTTP PUT request" or simply referred to as a "PUT request") to the server device 300 through HTTP, and subsequently transmits the data to be uploaded to the server device 300. Further, the client device 200 transmits a data download request (hereinafter referred to as an "HTTP GET request" or simply referred to as a "GET request") to the server device 300 through HTTP. When receiving the GET request, the server device 300 transmits the data to be downloaded to the client device 200. In such a manner, the client device 200 is able to upload the data to the server device 300 and download the data from the server device 300 (so-called cloud computing).

Functional Configuration of Client Device and Server Device

Figure 2:
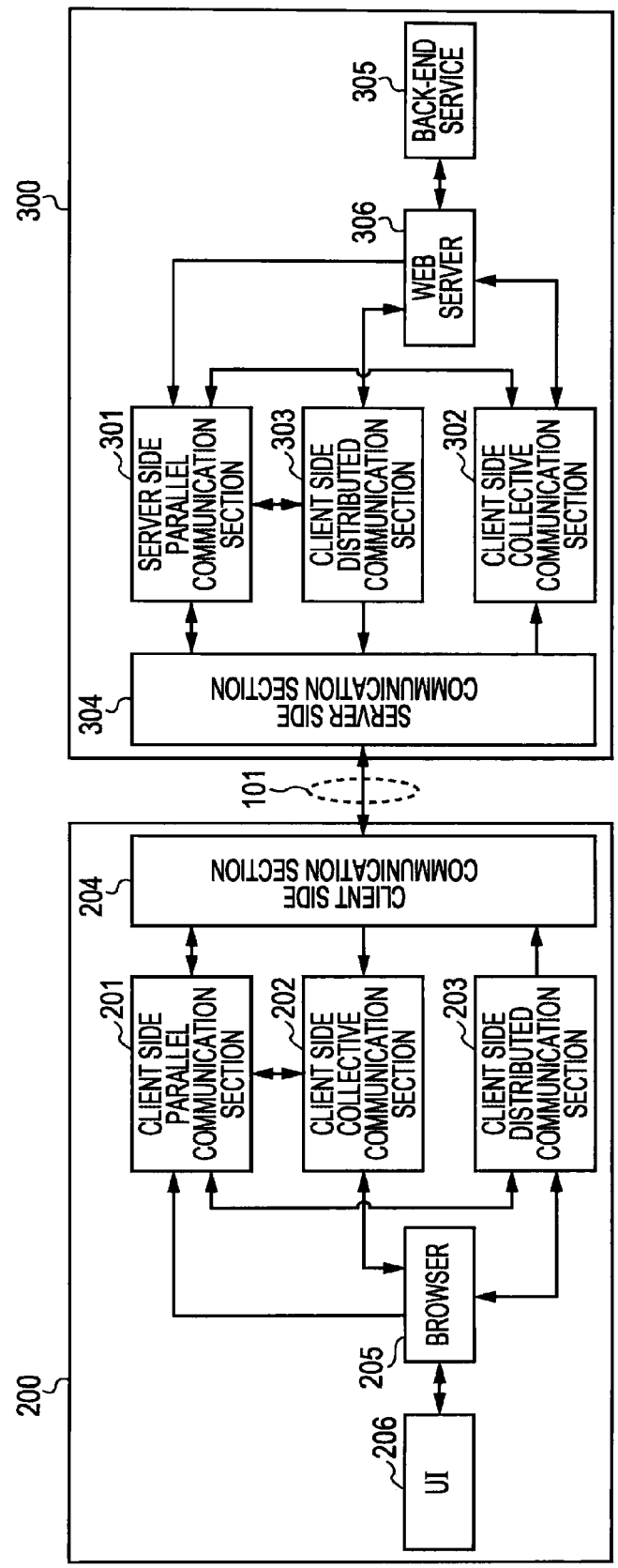
FIG. 2 is a block diagram illustrating functional configurations of a client device and a server device.

FIG. 2 is a block diagram illustrating functional configurations of the client device and the server device.

The client device 200 has a client side parallel communication section 201, a client side collective communication section 202, a client side distributed communication section 203, a client side communication section 204, a browser 205, and a UI (User Interface) 206.

The UI 206 is an interface for interchanging information between the client device 200 and a user.

The browser 205 performs HTTP processing in response to receiving the request which is input through the UI 206 from the user, and performs processing for analyzing contents and the like.

The client side parallel communication section 201 performs processing for initiating the parallel communication by establishing the plurality of TCP connections and the like.

The client side distributed communication section 203 performs processing, which is for distributively transmitting an HTTP transaction through the client side communication section 204 by using the plurality of TCP connections, and the like.

The client side collective communication section 202 performs processing, which is for performing recovery by collecting contents (chunks) which are received through the plurality of TCP connections by the client side communication section 204, and the like.

The server device 300 has a server side parallel communication section 301, a server side collective communication section 302, a server side distributed communication section 303, a server side communication section 304, a web server 306, and a back-end service 305.

The web server 306 performs processing for displaying the data and the like on the browser 205 of the client device 200 on the basis of HTTP.

The back-end service 305 performs processing of a command, which is requested by a user through the browser 205, and the like.

The server side parallel communication section 301 (the change means) performs processing, which is for specifying the upper limit of the number of the TCP connections appropriate to transmit and receive the data in response to receiving the request of the parallel communication from the client side parallel communication section 201, and the like.

The server side distributed communication section 303 performs processing, which is for distributively transmitting the HTTP transaction through the server side communication section 304 by using the plurality of TCP connections, and the like.

The server side collective communication section 302 performs processing, which is for performing recovery by collecting contents (chunks) which are received through the plurality of TCP connections by the server side communication section 304, and the like.

Data Communication Method

Next, a data communication method according to the embodiment will be described. Description will be given in order of the following items:

1. a data communication method in a case where the client device 200 downloads data from the server device 300;

2. a data communication method in a case where the client device 200 uploads data to the server device 300;

3. a data communication method in a case of increasing the number of TCP connections in the act of the data communication (download);

4. a data communication method in a case of increasing the number of TCP connections in the act of the data communication (upload);

5. a data communication method in a case of decreasing the number of TCP connections in the act of the data communication;

6. a data communication method (pipelining) in a case where the client device 200 transmits the GET request to the server device 300 and further transmits the PUT request before acquiring the response from the server device 300;

7. a data communication method (pipelining) in a case where the client device 200 transmits the GET request to the server device 300 and further transmits a separate GET request before acquiring the response from the server device 300;

8. a method (at the time of download) of recovering the data from unintentional disconnection of the TCP connections; and 9. a method (at the time of upload) of recovering the data from unintentional disconnection of the TCP connections.

1. Data Communication Method in Case Where Client Device Downloads Data from Server Device When receiving the HTTP request (a content reception request) from the browser 205, the client side parallel communication section 201 starts the parallel communication in the order of: transmission of the HTTP GET request (step S101); reception of the HTTP response header portion (step S102); establishment of the second and following TCP connections (steps S105 to S107); and notification of the established TCP connections to the client side collective communication section 202 and the client side distributed communication section 203.

It should be noted that the establishment of the TCP connection to be described below is initiated from the client device 200 to the server device 300 in all cases. The reason is to increase the possibility that the connections from the client device 200 to the server device 300 are established. In general, the environmental condition for allowing the connections to be established is more relaxed than the environmental condition for awaiting the connections. For example, the following environment is assumed: a gateway for controlling communication from the outside to the inside is present between the devices and the network 101. The gateway keeps the inside environment healthy by blocking inappropriate communication. In order to await connection, the gateway should allow communicating to a port which is fixed all the time, and thus it is necessary to provide a separate counter measure to block the undesired communication to the address of the port. On the other hand, in order to establish connection, only at the timing of the communication from the inside to the outside is present, only the communication, which is for the reply thereof, from the outside to the inside may be allowed. It is easy to block the communication, which is sent from an inappropriate sender, as the reply. As described above, by setting the environment which is easily built as a condition of the client side, the method is easily applied to a model as a service which a normal user accesses.

Figure 3:
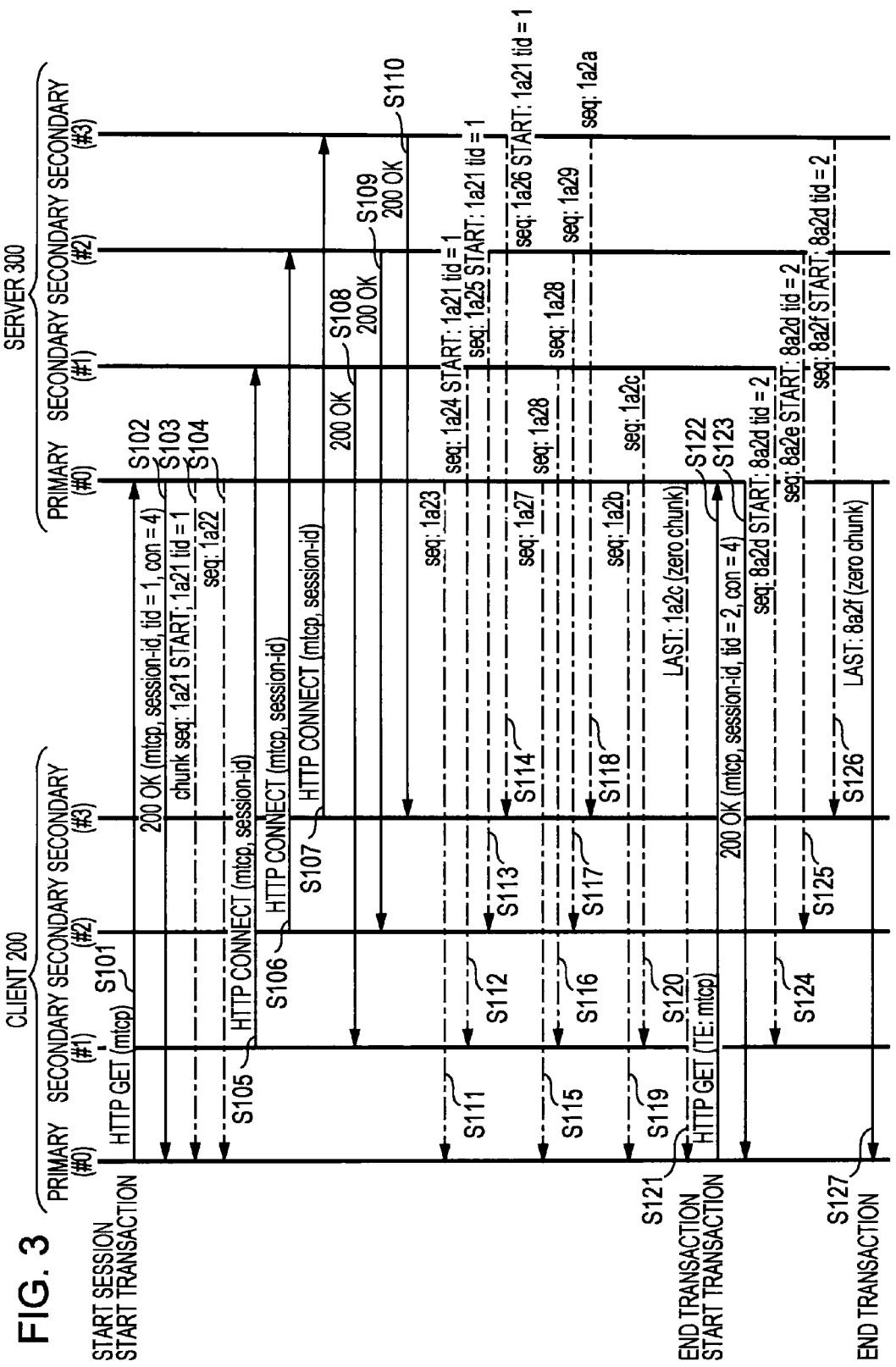
FIG. 3 is a sequence diagram illustrating a data communication method in a case where the client device downloads data from the server device.

FIG. 3 is a sequence diagram illustrating a data communication method in a case where the client device downloads data from the server device.

In addition, each solid-line arrow in the drawing represents communication between the client side parallel communication section 201 and the server side parallel communication section 301 through the client side communication section 204 and the server side communication section 304. Each chain-line arrow in the drawing represents communication between the client side collective communication section 202 and the server side distributed communication section 303 through the client side communication section 204 and the server side communication section 304.

When receiving the content reception request from the browser 205, the client side parallel communication section 201 establishes a first TCP connection #0 (hereinafter referred to as a "primary connection #0"). The client side parallel communication section 201 generates an HTTP GET request in which a value "mtcp" is assigned to a Transfer-Encoding header (hereinafter simply referred to as a "TE header") thereof. The client side parallel communication section 201 transmits the generated HTTP GET request to the server device 300 by using the primary connection #0 through the client side communication section 204 (step S101).

When receiving the HTTP GET request from the client side parallel communication section 201 through the server side communication section 304, the server side parallel communication section 301 issues a data transmission request to the back-end service 305. The location of the target data is specified by the URL of the request. The back-end service 305 stores the data, which is requested from the client device 200, in a send buffer (not shown in the drawing) of the server side distributed communication section 303.

Then, the server side parallel communication section 301 issues a unique session-id through the server device 300. Further, the server side parallel communication section 301 determines the upper limit of the number of the TCP connections appropriate to transmit the data which is requested by the HTTP GET request so as to be downloaded (for example, the number is three under the environmental of 3 Mbps per one TCP at 8 Mbps streaming contents). The server side parallel communication section 301 generates an HTTP response (200 OK), which represents a session-id and a value of the upper limit of the number of TCP connections, as a response to the HTTP GET request. The value "mtcp" is assigned to the TE header of the HTTP response (200 OK). The server side parallel communication section 301 transmits the generated HTTP response (200 OK) to the client device 200 by using the primary connection #0 through the server side communication section 304 (step S102). Then, the server side parallel communication section 301 notifies the data, which is requested by the received HTTP GET request so as to be downloaded, to the server side distributed communication section 303.

Here, the HTTP response (200 OK) includes an MTCP-session header. The syntax of the MTCP-session header is as follows: "MTCP-Session" ":" session-id "," tid["," con]. Here, the "session-id" is an integer that specifies the connection belonging to the same session. The "tid" (transaction ID, data specification information) is an integer for identifying the data to be transmitted, that is, an integer that specifies the transaction, and uses a unique value during the duration of a single session. The "con" (connection-upper-limit information) is an integer that represents the upper limit (the maximum number) of the number of the TCP connections through which the server device 300 is capable of corresponding to the client device 200. In addition, the "con" is indispensable for the case of the first transaction in a specific session, but may be omitted if it uses the same value as the previous value. Further, the server device 300 determines the appropriate number of the connections (the upper limit of the number of the connections). The reason is that the server device 300, which should process multiple connections to the plurality of client devices 200, is easily affected by the limitation in the processing capability as compared with the client device 200.

In step S102 of the drawing, an example, in which "tid=1" and "con=4" are set, is shown. That is, it can be seen that the transaction is a first transaction ("tid=1"), and the upper limit of the number of the TCP connections, through which the server device 300 is capable of corresponding to the client device 200, is 4 ("con=4").

The server side distributed communication section 303 divides the data, which is stored in the send buffer by the back-end service 305, into chunks, and respectively assigns sequence numbers to the chunks. Then, the server side distributed communication section 303 transmits a plurality of chunks, to which the sequence numbers are assigned, to the device 200 by using the primary connection #0 through the server side communication section 304 (steps S103 and S104). In addition, until the client side parallel communication section 201 establishes the second and following (in this example, maximum 4) TCP connections, the server side distributed communication section 303 transmits the respective chunk to the client device 200 by using the primary connection #0 through the server side communication section 304.

Here, a chunk header is written in each chunk. The syntax of the chunk header is as follows: chunk-size; seq=chunk-seq[; con=n; cseq=cmd-seq][; start=start-seq; tid=t-id]. Here, the "chunk-size" represents the length of the corresponding chunk. The "chunk-seq" (context-identification information) represents the sequence number (the serial number) of the chunk for identifying the positional relationship in the original data which is not divided. In addition, the "chunk-seq" of the first chunk is a random value, and a value, which is incremented in the sequence thereof before the data division, is written therein even if the following chunks pass through any of the TCP connections (here, the primary connection #0). The "start-seq", which is a value written as a start directive, represents the chunk-seq of the first chunk in the transaction. The "tid" represents a value of tid included in the HTTP response (200 OK). In addition, "n" and "cmd-seq" will be described later.

In step S103 of the drawing, an example, in which "chunk-seq: 1a21", "start-seq: 1a21", and "tid=1" are set, is shown. That is, it can be seen that the sequence number of the chunk is 1a21 ("chunk-seq: 1a21"), the sequence number of the first chunk in the transaction is 1a21 ("start-seq: 1a21"), and the transaction is a first transaction ("tid=1"). Then, in step S104 of the drawing, subsequently to the chunk with the sequence number of 1a21, the chunk with the sequence number of 1a22 ("chunk-seq: 1a22") is transmitted. It should be noted that, in the drawing, the chunk header of the chunk transmitted in step S104 is partially omitted.

The client side collective communication section 202 receives the respective chunks which are transmitted from the server device 300 by using the primary connection #0 through the client side communication section 204. The client side collective communication section 202 has a receive buffer (not shown in the drawing), and temporarily stores the received chunks in the receive buffer.

On the other hand, when receiving the HTTP response (200 OK) (step S102) from the server side parallel communication section 301 through the client side communication section 204, the client side parallel communication section 201 checks the value of the "con" included in the MTCP-session header. That is, the client side parallel communication section 201 checks the upper limit of the number of the TCP connections through which the server device 300 is capable of corresponding to the client device 200. When it is determined that the "con" is 2 or more, the client side parallel communication section 201 establishes the second and following TCP connections (hereinafter referred to as "secondary connections"). In this example, since "con=4", the client side parallel communication section 201 establishes a total of four TCP connections including the primary connection #0. That is, the client side parallel communication section 201 establishes three secondary connections #1, #2, and #3. The client side parallel communication section 201 transmits the HTTP CONNECT requests to the server side parallel communication section 301 in parallel by respectively using the established secondary connections #1, #2, and #3 through the client side communication section 204 (steps S105 to S107).

In addition, normally, the client side parallel communication section 201 establishes the secondary connections such that the number of the connections reaches the upper limit which is specified by the value of the "con" included in the MTCP-session header. However, for example, in such a case where the processing capability sufficient for separate processing is absent, it may be difficult to establish the secondary connections of which the number is specified. In this case, the client side parallel communication section 201 may establish the secondary connections of which the number is allowable in the range of the upper limit.

Here, the client side parallel communication section 201 assigns the session-id, which is received in step S102, to the value of the MTCP-session header of the HTTP CONNECT request, and assigns the "mtcp" to the TE header.

The server side parallel communication section 301 receives the HTTP CONNECT requests through the server side communication section 304 by respectively using the secondary connections #1, #2, and #3. The server side parallel communication section 301 determines which primary connection the secondary connections belong to, with reference to the session-ids indicated by the received HTTP CONNECT requests. In this example, the server side parallel communication section 301 determines that the secondary connections #1, #2, and #3 belong to the primary connection #0, with reference to the session-ids indicated by the HTTP CONNECT requests which are respectively received through the secondary connections #1, #2, and #3. In addition, when the corresponding session-ids are absent, or when the number of the secondary connections exceeds the upper limit, the server side parallel communication section 301 transmits an error to the client device 200 through the server side communication section 304. Subsequently, the server side parallel communication section 301 transmits the HTTP responses (200 OK) to the client device 200 in parallel by respectively using the secondary connections #1, #2, and #3 through the server side communication section 304 (steps S108 to S110). Then, the server side parallel communication section 301 notifies the established secondary connections #1, #2, and #3 to the server side collective communication section 302 and the server side distributed communication section 303.

When receiving the respective HTTP responses (200 OK) through the client side communication section 204, the client side parallel communication section 201 notifies the established secondary connections #1, #2, and #3 to the client side collective communication section 202 and the client side distributed communication section 203. The processing of starting the parallel communication is hitherto completed.

When receiving the notification of the establishment of the secondary connections #1, #2, and #3 from the server side parallel communication section 301, the server side distributed communication section 303 transmits the plurality of chunks, to which the sequence numbers are assigned, to the client device 200 in parallel by using the arbitrary TCP connections (the primary and secondary connections #0, #1, #2, and #3) through the server side communication section 304 (steps S111 to S120).

In addition, the server side distributed communication section 303 monitors a send socket buffer for each of the TCP connections (the primary and secondary connections #0, #1, #2, and #3). Then, when an unused space appears in the send socket buffer of any one of the TCP connections, the server side distributed communication section 303 may further divide the unsent data of the send buffers belonging to the server side distributed communication section 303 into chunks, and may move the data to the send socket buffer in which the unused space appears.

In the drawing, the server side distributed communication section 303 transmits the respective chunks, which are indicated in advance by the "chunk-seq: 1a21" and "chunk-seq: 1a22" in steps S103 and S104, to the server side communication section 304. Accordingly, each "chunk-seq" (sequence numbers) of the chunks, which are continuously transmitted to the server side communication section 304 by the server side distributed communication section 303, can be sequentially represented by 1a23, 1a24, 1a25, . . . , 1a2a, 1a2b, and 1a2c. For example, as the chunk header of the chunk which is transmitted in step S112, "chunk-seq: 1a24", "start-seq: 1a21", and "tid=1" are set. That is, it can be seen that the sequence number of the chunk is 1a24 ("chunk-seq: 1a24"), the sequence number of the first chunk in the transaction is 1a21 ("start-seq: 1a21"), and the transaction is a first transaction ("tid=1"). It should be noted that, in the drawing, the chunk headers of the chunks transmitted in steps S111 to S120 are partially omitted. Further, in the following drawings, some chunk headers are partially omitted.

The client side collective communication section 202 receives the respective chunks which are transmitted from the server device 300 by using the primary and secondary connections #0, #1, #2, and #3 through the client side communication section 204. The client side collective communication section 202 temporarily stores the received chunks in the receive buffer, regardless of which TCP connection (the primary and secondary connections #0, #1, #2, and #3) is used. The client side collective communication section 202 collects the chunks to some extent, and then supplies a sequence of the chunks, of which the sequence numbers are consecutive, as received data to the browser 205. The client side collective communication section 202 repeats the processing. In addition, if the connection is not disconnected but there is a portion in which the sequence number is omitted, the client side collective communication section 202 awaits the arrival of the omitted chunk from the server device 300 while storing the chunks, which is received after the omission, in the receive buffer.

The server side distributed communication section 303 transmits the chunk, to which the last sequence number is assigned, among the plurality of chunks, into which single data is divided, to the client device 200 through the server side communication section 304 (step S120). Subsequently, the server side distributed communication section 303 transmits a zero chunk to the client device 200 by using the primary connection #0 through the server side communication section 304 (step S121).

Here, the zero chunk is a chunk which has only the chunk header without data. The form of the zero chunk is, for example, as follows: 0; [con=n; cseq=cmd-seq]; last=last-seq. The "last-seq" represents the last sequence number of the plurality of chunks into which single data is divided, that is, the sequence number of the last chunk in a single transaction. In addition, the "n" and "cmd-seq" will be described later.

The client side collective communication section 202 receives the zero chunk, which is transmitted from the server device 300, through the client side communication section 204. When receiving the zero chunk, the client side collective communication section 202 determines that all the chunks are received, and notifies data reception completion to the browser 205. Thereby, the single transaction is terminated.

Subsequently, a separate transaction is further performed (steps S122 to S127). In the following description, the same processes as the processes of the above-described data communication method will be omitted or will be briefly described, and the description will be given focusing on the difference therebetween.

In step S123 of the drawing, an example, in which "tid=2" and "con=4" are set in the HTTP response (200 OK), is shown. That is, it can be seen that the transaction is a second transaction ("tid=2"), and the upper limit of the number of the TCP connections through which the server device 300 is capable of corresponding to the client device 200 is 4 ("con=4") the same as described above. Accordingly, the client device 200 is not necessary to newly establish the secondary connection, and may keep using the four TCP connections (the primary and secondary connections #0, #1, #2, and #3) the same as described above.

Figure 4:
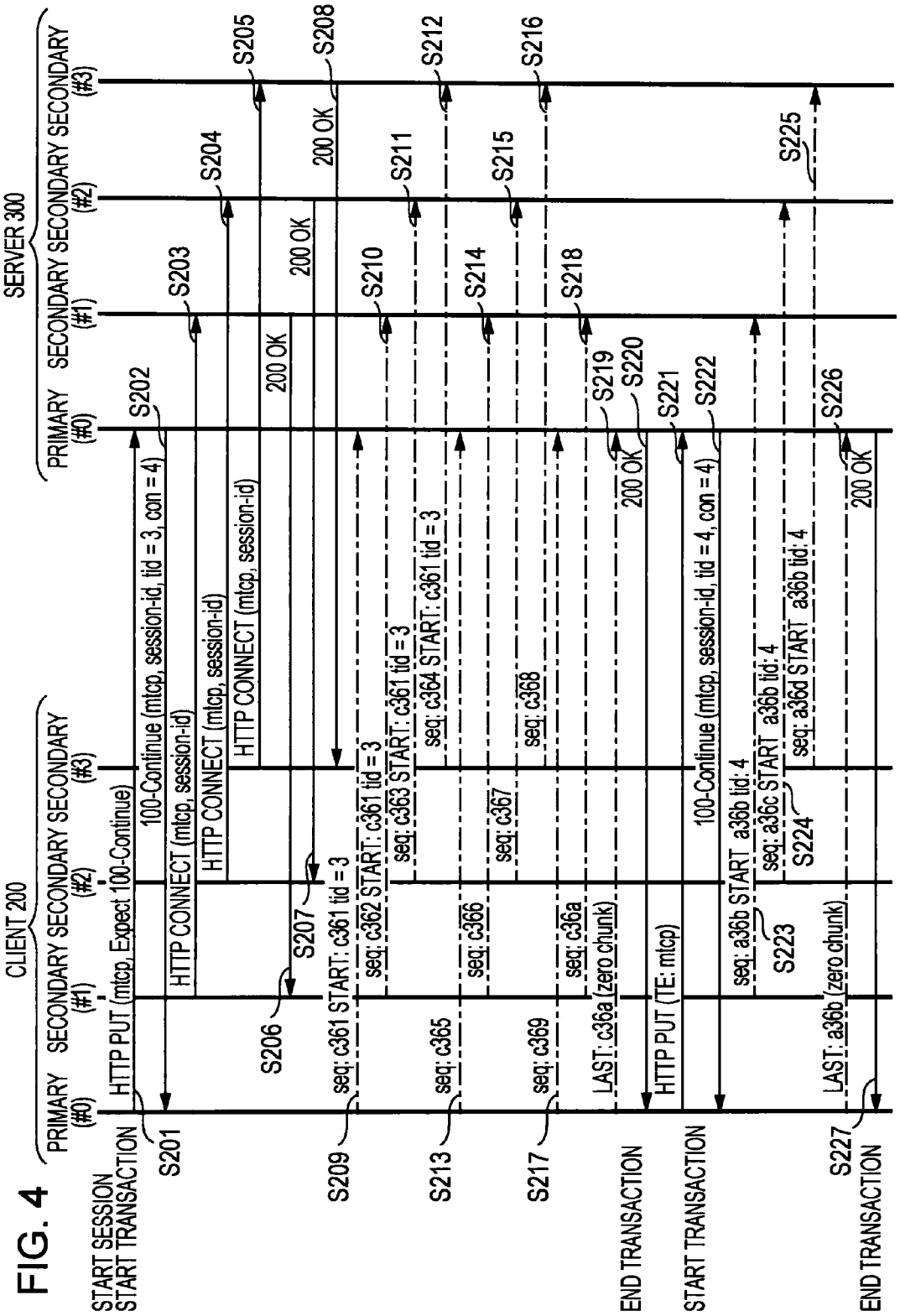
FIG. 4 is a sequence diagram illustrating a data communication method in a case where the client device uploads data to the server device.

2. Data Communication Method in Case Where Client Device Uploads Data to Server Device FIG. 4 is a sequence diagram illustrating a data communication method in a case where the client device uploads data to the server device.

The browser 205 notifies a content transmission request to the client side parallel communication section 201 in response to receiving the content transmission request which is input though the UI 206 from a user, and allocates the data to be transmitted to the send buffer (not shown in the drawing) of the client side distributed communication section 203. When receiving the content transmission request from the browser 205, the client side parallel communication section 201 establishes the first TCP connection #0 (the primary connection #0). The client side parallel communication section 201 generates the HTTP PUT request in which a value "mtcp" is assigned to the TE header thereof. The client side parallel communication section 201 transmits the generated HTTP PUT request to the server device 300 by using the primary connection #0 through the client side communication section 204 (step S201).

Here, the first HTTP PUT request after the establishment of the primary connection #0 includes an Expect header. The value of the Expect header is "100-Continue".

When receiving the HTTP PUT request from the client side parallel communication section 201 through the server side communication section 304, the server side parallel communication section 301 issues the unique session-id through the server device 300. Further, the server side parallel communication section 301 determines the upper limit of the number of the TCP connections appropriate to transmit the data which is requested by the HTTP PUT request so as to be uploaded. The server side parallel communication section 301 generates the HTTP response (100-Continue), which represents the session-id, the tid, and the con (the upper limit of the number of TCP connections), as a response to the HTTP PUT request. The value "mtcp" is assigned to the TE header of the HTTP response (100-Continue). The server side parallel communication section 301 transmits the generated HTTP response (100-Continue) to the client device 200 by using the primary connection #0 through the server side communication section 304 (step S202).

Here, the HTTP response (100-Continue) includes: the "session-id" that specifies the connection belonging to the same session; the "tid" that specifies the transaction; the "con" that represents the upper limit of the number of the TCP connections; and the like.

In step S202 of the drawing, an example, in which "tid=3" and "con=4" are set, is shown. That is, it can be seen that the transaction is a third transaction ("tid=3"), and the upper limit of the number of the TCP connections, through which the server device 300 is capable of corresponding to the client device 200, is 4 ("con=4").

When receiving the HTTP response (100-Continue) (step S202) from the server side parallel communication section 301 through the client side communication section 204, the client side parallel communication section 201 checks the value of the "con" included in the MTCP-session header, and establishes the second and following TCP connections. The client side parallel communication section 201 transmits the HTTP CONNECT requests to the server side parallel communication section 301 in parallel by respectively using the established secondary connections #1, #2, and #3 through the client side communication section 204 (steps S203 to S205).

The server side parallel communication section 301 receives the HTTP CONNECT requests through the server side communication section 304 by respectively using the secondary connections #1, #2, and #3. The server side parallel communication section 301 determines which primary connection the secondary connections belong to, with reference to the session-ids indicated by the received HTTP CONNECT requests. Subsequently, the server side parallel communication section 301 transmits the HTTP responses (200 OK) to the client device 200 in parallel by respectively using the secondary connections #1, #2, and #3 through the server side communication section 304 (steps S206 to S208). Then, the server side parallel communication section 301 notifies the established secondary connections #1, #2, and #3 to the server side collective communication section 302 and the server side distributed communication section 303.

When receiving the respective HTTP responses (200 OK) through the client side communication section 204, the client side parallel communication section 201 notifies the established secondary connections #1, #2, and #3 to the client side collective communication section 202 and the client side distributed communication section 203. The processing of starting the parallel communication is hitherto completed.

When receiving the notification, the client side distributed communication section 203 divides the data, which is allocated to the send buffer by the browser 205, into chunks, and respectively assigns sequence numbers to the chunks. Then, the client side distributed communication section 203 transmits the plurality of chunks, to which the sequence numbers are assigned, to the server device 300 by using the primary and secondary connections #0, #1, #2, and #3 through the client side communication section 204 (steps S209 to S218).

The server side collective communication section 302 receives the respective chunks which are transmitted from the client device 200 by using the primary and secondary connections #0, #1, #2, and #3 through the server side communication section 304. The server side collective communication section 302 temporarily stores the received chunks in the receive buffer, regardless of which TCP connection (the primary and secondary connections #0, #1, #2, and #3) is used. The server side collective communication section 302 collects the chunks to some extent, and then supplies a sequence of the chunks, of which the sequence numbers are consecutive, as received data to the web server 306. The server side collective communication section 302 repeats the processing.

In addition, if the connection is not disconnected but there is a portion in which the sequence number is omitted, the server side collective communication section 302 awaits the arrival of the omitted chunk from the client device 200 while storing the chunks, which is received after the omission, in the receive buffer.

The client side distributed communication section 203 transmits the chunk, to which the last sequence number is assigned, among the plurality of chunks, into which single data is divided, to the server device 300 through the client side communication section 204 (step S218). Subsequently, the client side distributed communication section 203 transmits a zero chunk to the server device 300 by using the primary connection #0 through the client side communication section 204 (step S219).

The server side collective communication section 302 receives the zero chunk, which is transmitted from the client device 200, through the server side communication section 304. When receiving the zero chunk, the server side collective communication section 302 determines that all the chunks are received, and notifies data reception completion to the server side parallel communication section 301.

When receiving the notification of the data reception completion, the server side parallel communication section 301 generates the HTTP responses (200 OK), and transmits the HTTP responses (200 OK) to the client device 200 by using the primary connection #0 through the server side communication section 304 (step S220).

When receiving the respective HTTP responses (200 OK) through the client side communication section 204, the client side parallel communication section 201 determines that the upload of the data is completed. Thereby, the single transaction is terminated.

Subsequently, a separate transaction is further performed (steps S221 to S227). In step S222 of the drawing, an example, in which "tid=4" and "con=4" are set in the HTTP response (100-Continue), is shown. That is, it can be seen that the transaction is a fourth transaction ("tid=4"), and the upper limit of the number of the TCP connections through which the server device 300 is capable of corresponding to the client device 200 is 4 ("con=4") the same as described above. Accordingly, the client device 200 is not necessary to newly establish the secondary connection, and may keep using the four TCP connections (the primary and secondary connections #0, #1, #2, and #3) the same as described above.

3. Data Communication Method in Case of Increasing the Number of TCP Connections in Act of Data Communication (Download)

Figure 5:
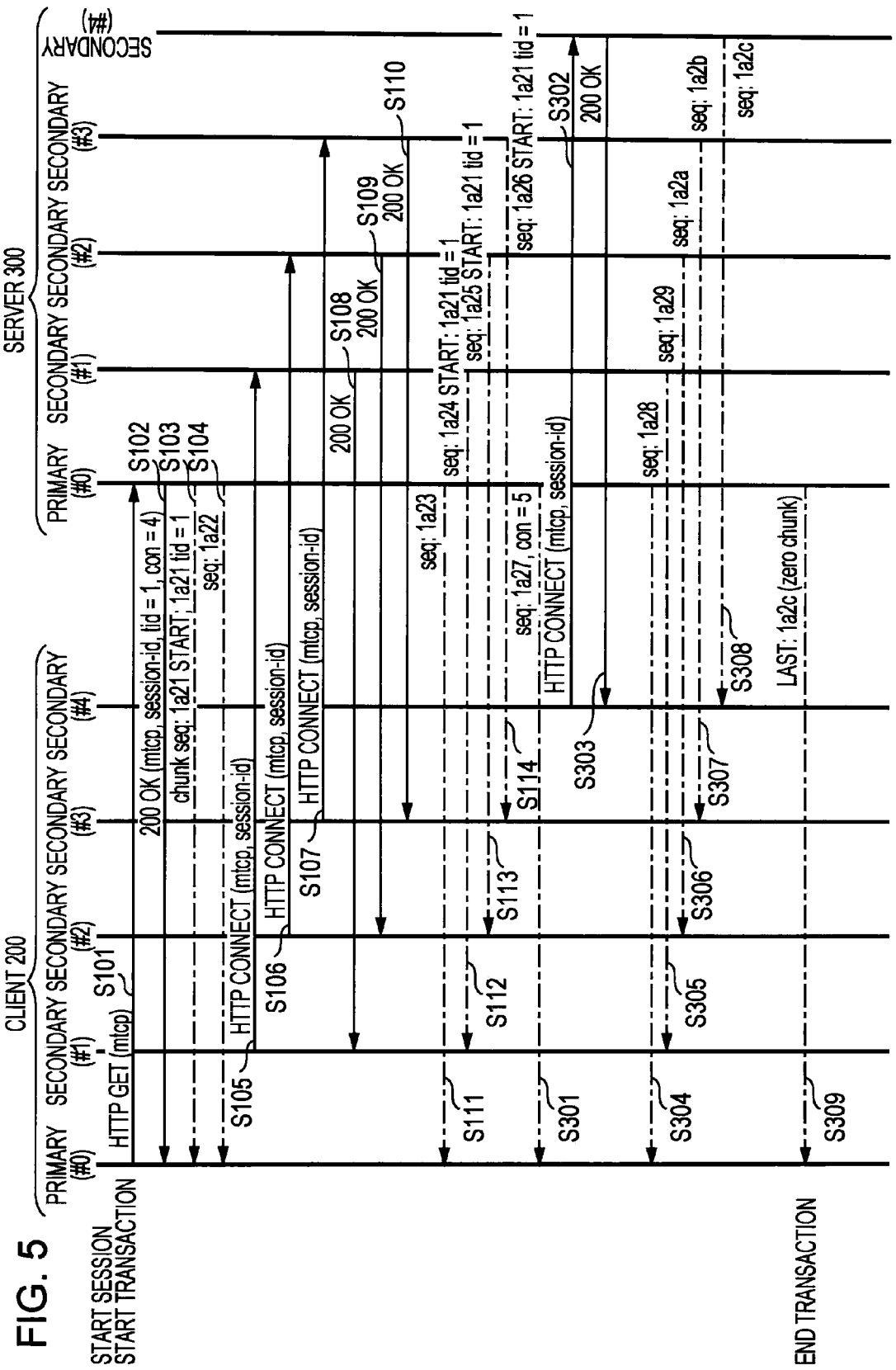
FIG. 5 is a sequence diagram illustrating a data communication method in a case of increasing the number of TCP connections in the act of the data communication (download)

FIG. 5 is a sequence diagram illustrating a data communication method in a case of increasing the number of TCP connections in the act of the data communication (download).

First, the client device 200 and the server device 300 perform processing of starting the parallel communication (steps S101 to S110). Then, the server side distributed communication section 303 transmits the plurality of chunks, to which the sequence numbers are assigned, to the client device 200 in parallel by using the arbitrary TCP connections (the primary and secondary connections #0, #1, #2, and #3) through the server side communication section 304 (steps S111 to S114).

Here, the back-end service 306 determines that the upper limit of the number of the TCP connections capable of performing processing for the client device 200 increases. In this case, the back-end service 306 notifies the increase of the upper limit of the number of the TCP connections to the server side parallel communication section 301, and the server side parallel communication section 301 notifies the increase of the upper limit of the number of the TCP connections to the server side distributed communication section 303. When receiving the notification, the server side distributed communication section 303 rewrites the chunk header, which is attached to the chunk to be transmitted to the client device 200 next time, as follows. As described above, the syntax of the chunk header is as follows: chunk-size; seq=chunk-seq[; con=n; cseq=cmd-seq][; start=start-seq; tid=t-id]. The server side distributed communication section 303 assigns the upper limit of the number of the TCP connections (for example, "con=5"), which is included in the notification sent from the server side parallel communication section 301, to "con=n". Furthermore, the server side distributed communication section 303 assigns a value, which is obtained by incrementing the previous cmd-seq, to the "cmd-seq". It should be noted that the first value thereof is set as a random value. The server side distributed communication section 303 transmits the chunk, to which the rewritten chunk header is attached, to the client device 200 by using the arbitrary TCP connection (for example, the primary connection #0) (step S301).

Here, the "cmd-seq" is an integer representing the sequence of the request for change in the number of connections which is sequentially updated in accordance with the change of the connection-upper-limit information. In the parallel communication according to the embodiment, the data (plurality of chunks), which is transmitted to the server side communication section 304 by the server side distributed communication section 303, may arrive at the client side collective communication section 202 through the different TCP connection. In this case, the sequence of arrival of the data is likely to be changed. For example, it is assumed that the server side distributed communication section 303 transmits the chunks to the server side communication section 304 in the order of the chunk A including the chunk header to which "con=1" and "cmd-seq=1" are assigned, the chunk B including the chunk header to which "con=4" and "cmd-seq=2" are assigned, and the chunk C including the chunk header to which "con=2" and "cmd-seq=3" are assigned. However, it is assumed that the client side collective communication section 202 receives the chunks through the client side communication section 204 in the order of the chunk A ("con=1", "cmd-seq=1"), the chunk C ("con=2", "cmd-seq=3"), and the chunk B ("con=4", "cmd-seq=2"). The client side collective communication section 202 compares the values of the cmd-seq included in the plurality of the received chunks with each other, and determines the cmd-seq to which a largest value is set. Then, the client side collective communication section 202 determines that the chunk header including the cmd-seq, to which the largest value is set, represents the latest con. As described above, by setting the cmd-seq, even when the sequence of arrival of the data is changed, the client side collective communication section 202 determines the latest upper limit of the number of the TCP connections.

The client side collective communication section 202 receives the chunk from the server side distributed communication section 303 through the client side communication section 204, and then checks the value of the cmd-seq of the chunk header. The client side collective communication section 202 determines that a value different from the previous value is set to the cmd-seq, and then notifies the value of the con of the chunk header, that is, the upper limit of the number of the TCP connections to the client side parallel communication section 201.

The client side parallel communication section 201 acquires the upper limit of the number of the TCP connections from the client side collective communication section 202, and then establishes a new TCP connection (a secondary connection #4). The client side parallel communication section 201 transmits the HTTP CONNECT request to the server side parallel communication section 301 in parallel by respectively using the newly established secondary connection #4 through the client side communication section 204 (step S302).

When receiving the HTTP CONNECT request through the server side communication section 304 by using the secondary connection #4, the server side parallel communication section 301 transmits the HTTP responses (200 OK) to the client device 200 by using the secondary connection #4 through the server side communication section 304 (step S303). Then, the server side parallel communication section 301 notifies the established secondary connection #4 to the server side collective communication section 302 and the server side distributed communication section 303.

When receiving the respective HTTP responses (200 OK) through the client side communication section 204, the client side parallel communication section 201 notifies the established secondary connection #4 to the client side collective communication section 202 and the client side distributed communication section 203.

When receiving the notification of the establishment of the secondary connection #4 from the server side parallel communication section 301, the server side distributed communication section 303 transmits the plurality of chunks, to which the sequence numbers are assigned, to the client device 200 in parallel by using the arbitrary TCP connections (the primary and secondary connections #0, #1, #2, #3, and #4), and finally transmits the zero chunk to the client device 200 by using the primary connection #0, through the server side communication section 304 (steps S304 to S309).

4. Data Communication Method in Case of Increasing the Number of TCP Connections in Act of Data Communication (Upload)

Figure 6:
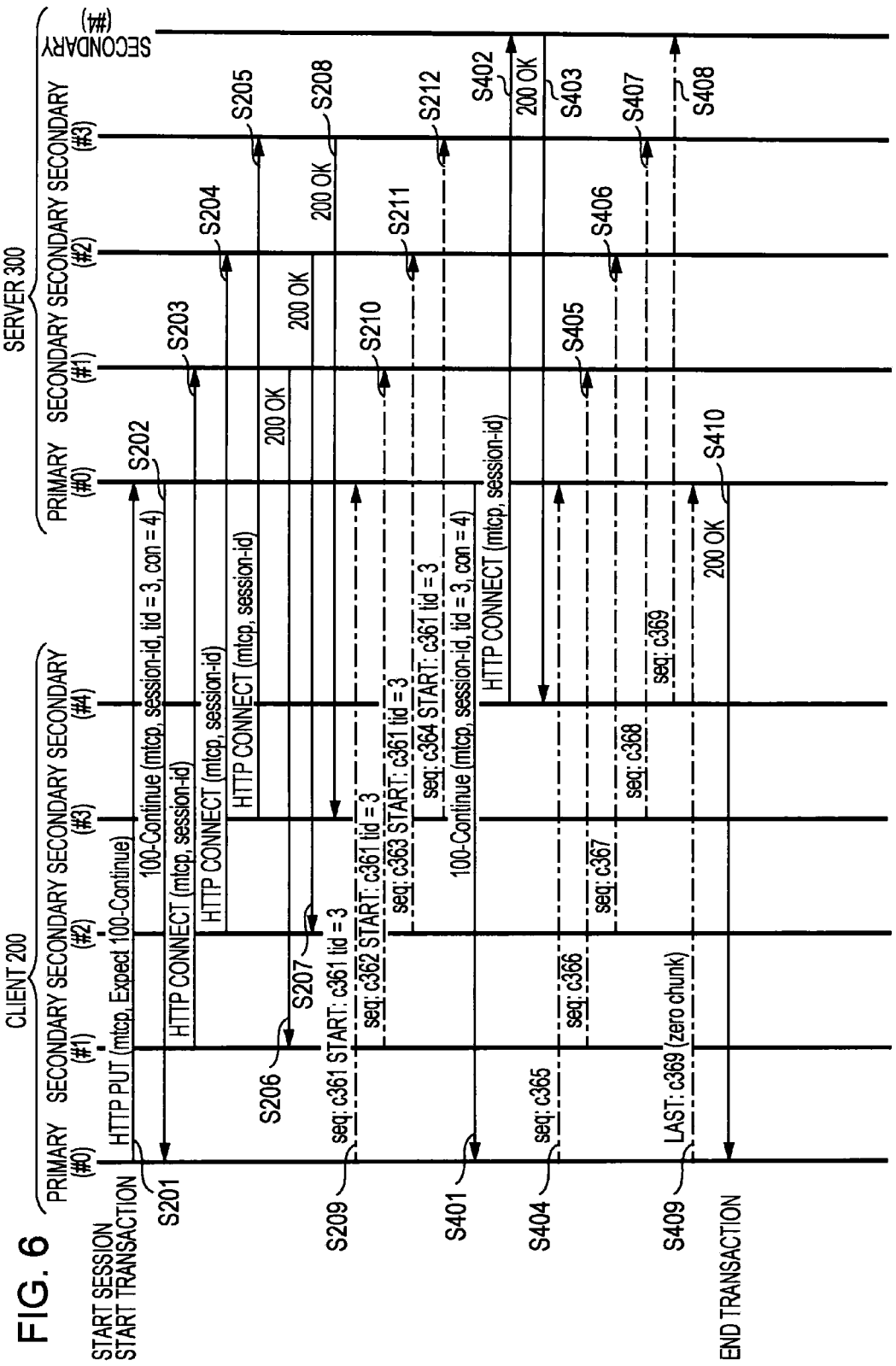
FIG. 6 is a sequence diagram illustrating a data communication method in a case of increasing the number of TCP connections in the act of the data communication (upload)

FIG. 6 is a sequence diagram illustrating a data communication method in a case of increasing the number of TCP connections in the act of the data communication (upload).

First, the client device 200 and the server device 300 perform processing of starting the parallel communication (steps S201 to S208). Then, the client side distributed communication section 203 transmits the plurality of chunks, to which the sequence numbers are assigned, to the server device 300 in parallel by using the arbitrary TCP connections (the primary and secondary connections #0, #1, #2, and #3) through the client side communication section 204 (steps S209 to S212).

Here, the server side parallel communication section 301 determines that the upper limit of the number of the TCP connections capable of performing processing for the client device 200 on the server device 300 side increases. In this case, the server side parallel communication section 301 generates the HTTP response (100-Continue) having the MTCP-session header in which the new upper limit of the number of the TCP connections is assigned to the con. The server side parallel communication section 301 transmits the generated HTTP response (100-Continue) to the client device 200 by using the primary connection #0 through the server side communication section 304 (step S401).

When receiving the HTTP response (100-Continue) (step S401) from the server side parallel communication section 301 through the client side communication section 204, the client side parallel communication section 201 checks the value of the "con" included in the MTCP-session header. That is, the client side parallel communication section 201 checks the upper limit of the number of the TCP connections compatible with the server device 300, and then establishes the new TCP connection (in this example, the secondary connection #4). The client side parallel communication section 201 transmits the HTTP CONNECT request to the server side parallel communication section 301 in parallel by respectively using the newly established secondary connection #4 through the client side communication section 204 (step S402).

The server side parallel communication section 301 receives the HTTP CONNECT request through the server side communication section 304 by using the secondary connection #4. Subsequently, the server side parallel communication section 301 transmits the HTTP responses (200 OK) to the client device 200 in parallel by using the secondary connection #4 through the server side communication section 304 (step S403). Then, the server side parallel communication section 301 notifies the newly established secondary connection #4 to the server side collective communication section 302 and the server side distributed communication section 303.

When receiving the respective HTTP responses (200 OK) through the client side communication section 204, the client side parallel communication section 201 notifies the established secondary connection #4 to the client side collective communication section 202 and the client side distributed communication section 203.

When receiving the notification of the establishment of the secondary connection #4 from the client side parallel communication section 201, the client side distributed communication section 203 transmits the plurality of chunks, to which the sequence numbers are assigned, to the client device 200 in parallel by using the arbitrary TCP connections (the primary and secondary connections #0, #1, #2, #3, and #4) through the server side communication section 304, and finally transmits the zero chunk to the server device 300 by using the primary connection #0, through the client side communication section 204 (steps S404 to S409).

When receiving the zero chunk which is transmitted from the client device 200 through the server side communication section 304, the server side collective communication section 302 determines that all the chunks are received, and notifies data reception completion to the server side parallel communication section 301. When receiving the notification of the data reception completion, the server side parallel communication section 301 generates the HTTP responses (200 OK), and transmits the HTTP responses (200 OK) to the client device 200 by using the primary connection #0 through the server side communication section 304 (step S410).

Figure 7:
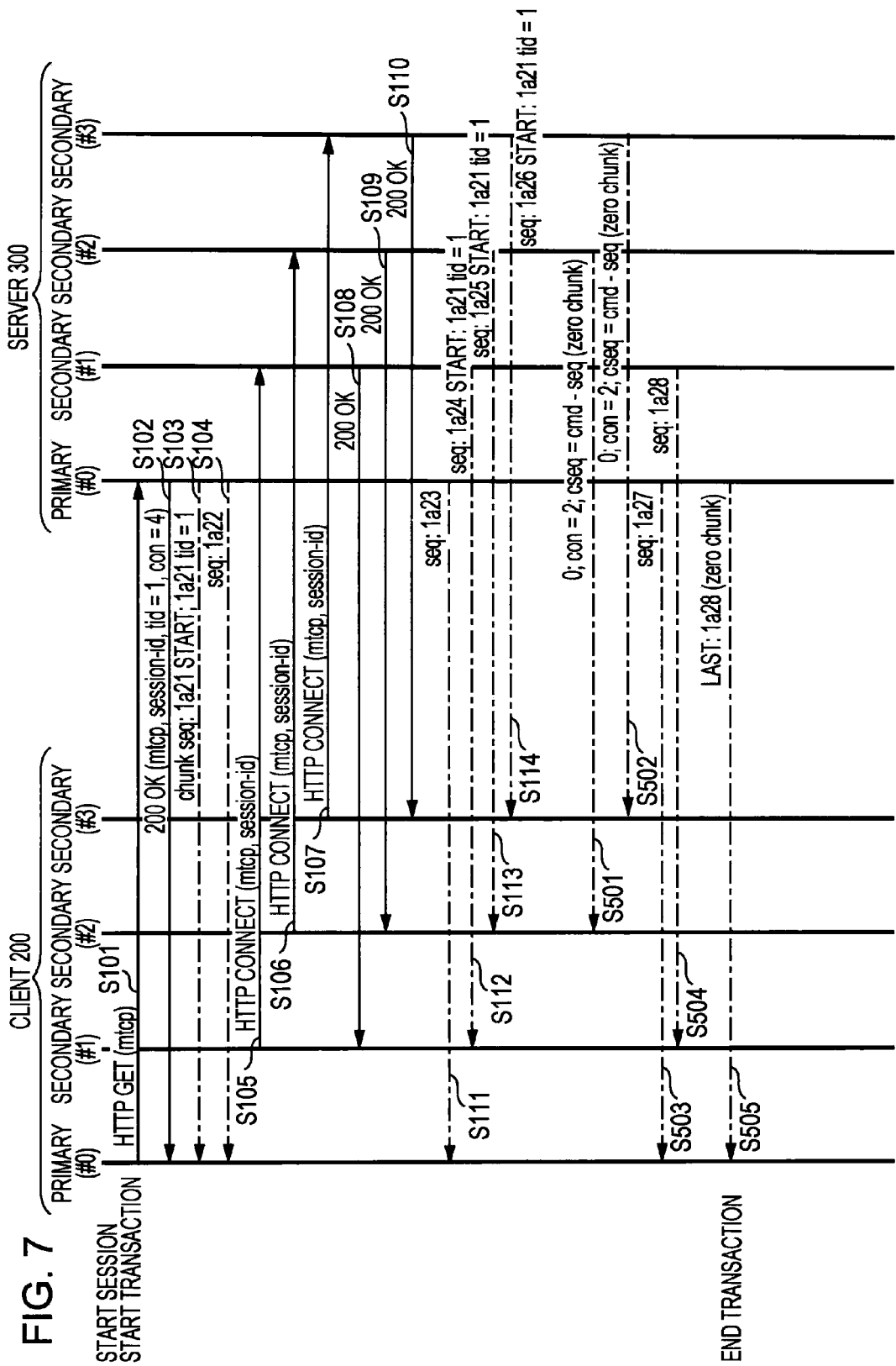
FIG. 7 is a sequence diagram illustrating a data communication method in a case of decreasing the number of TCP connections in the act of the data communication.

5. Data Communication Method in Case of Decreasing the Number of TCP Connections in Act of Data Communication FIG. 7 is a sequence diagram illustrating a data communication method in a case of decreasing the number of TCP connections in the act of the data communication.

The data communication method in the case of decreasing the number of TCP connections in the act of the data communication (download) will be described herein.

First, the client device 200 and the server device 300 perform processing of starting the parallel communication (steps S101 to S110). Then, the server side distributed communication section 303 transmits the plurality of chunks, to which the sequence numbers are assigned, to the client device 200 in parallel by using the arbitrary TCP connections (the primary and secondary connections #0, #1, #2, and #3) through the server side communication section 304 (steps S111 to S114).

Here, the server side parallel communication section 301 determines that the number of the TCP connections capable of performing processing for the client device 200 on the server device 300 side decreases. In this case, in order to decrease the number of TCP connections, it is necessary to stop the data communication using the TCP connections to be reduced. Otherwise, data loss occurs. In order to prevent the data loss from occurring, the number of TCP connections is decreased by the following method.

The server side parallel communication section 301 issues notification to decrease the number of TCP connections to the server side distributed communication section 303. When receiving the notification, the server side distributed communication section 303 transmits the zero chunk to the client device 200 by using the secondary connections to be reduced through the server side communication section 304. Here, the form of the zero chunk is, for example, as follows: "0; con=n; cseq=cmd-seq".

This example shows the following case: when currently four TCP connections (including the primary connection) are used, two TCP connections are set by disconnecting two secondary connections among them. The server side distributed communication section 303 arbitrarily selects the two secondary connections (for example secondary connections #2 and #3) as disconnection targets. The server side distributed communication section 303 transmits the zero chunk, to which con=2 is assigned, to the client device 200 by using the selected secondary connections #2 and #3 through the server side communication section 304 (step S501, S502).

In addition, the normal chunks are communicated after the download/upload is performed through the primary connection. However, the zero chunk may be transmitted from the server device 300 to the client device 200 at an arbitrary timing even after the download/upload is completed.

When transmitting the zero chunk to the client device 200 through the server side communication section 304, the server side distributed communication section 303 stops the transmission of the new chunks using the secondary connections #2 and #3 as the disconnection targets. Then, the server side distributed communication section 303 waits to disconnect the secondary connections #2 and #3 by the client device 200. However, since the chunk for PUT is likely to arrive at the server side collective communication section 302 from the client side distributed communication section 203, the server side collective communication section 302 is on standby for reception of the chunk until the secondary connections #2 and #3 are disconnected. The reason is that the following case is considered: the client device 200 starts the upload processing at a time substantially the same as the time at which the server side distributed communication section 303 transmits the zero chunk. That is, the reason is that, in such a case, before the zero chunk arrives at the client device 200, the client side distributed communication section 203 is likely to transmit the chunk for upload to the client side communication section 204 by using the secondary connections #2 and #3.

Thereafter, the server side distributed communication section 303 transmits the plurality of chunks to the client device 200 in parallel by using the arbitrary TCP connections (the primary and secondary connections #0 and #1) except the disconnected secondary connections #2 and #3 through the server side communication section 304 (steps S503 and S504). Subsequently, the server side distributed communication section 303 transmits a zero chunk to the client device 200 by using the primary connection #0 through the server side communication section 304 (step S505).

The description has been hitherto given of the data communication method in the case of decreasing the number of TCP connections in the act of the data communication (download), but in the act of the data communication (upload), the following processing may be performed. That is, the client side distributed communication section 203 stops transmitting a new chunk in response to receiving the zero chunk if the chunk for upload is being transmitted. Then, the client side distributed communication section 203 checks that the transmitted chunk arrives at the server device 300, and disconnects the connections as disconnection targets. In addition, the technique, in which the client side distributed communication section 203 checks that the transmitted chunk arrives at the server device 300, is possible on the premise that there is a reliable transport such as TCP.

According to the embodiment, by dynamically increasing or decreasing the number of the secondary connections, it is possible to control the throughput. The dynamic control on the number of the secondary connections is advantageous, for example, in the following cases.

It is assumed that the link speed of the path is L and the throughput of a single TCP connection is T. Under the assumption, when n connections where n is a largest natural number in the condition of $nT<L$ are established, it is possible to obtain the maximum throughput. It should be noted that, although n is set to be equal to or larger than the above condition, an error occurs due to the limitation of the link speed L, and thus it is difficult to obtain the throughput.

Further, for example, in a case where the necessary throughput (which is represented by Q and satisfies $Q<L$) may be determined like streaming, it is ineffective to establish connections of which the number is equal to or larger than that of the throughput necessary therefor. In this case, m TCP connections where m is a minimum in the condition of $mT>Q$ may be established.

Further, in a case where the single server device 300 and the plurality of client devices 200 perform communication around the same time, due to the limitation of the processing capability of the server device 300, the throughput, which can be provided per one client device 200, is limited. When the number of client devices 200 increases, by lowering the throughputs to the connected client devices 200, it is possible to make them equivalent to the throughputs to new client devices 200. Thereby, it is possible to equally perform services among the plurality of client devices 200.

6. Data Communication Method (Pipelining) in Case Where Client Device Transmits GET Request to Server Device and Further Transmits PUT Request Before Acquiring Response from Server Device First, the HTTP pipelining in the related art will be described. The HTTP pipelining is a technique in which a client transmits an HTTP request and further transmits the following HTTP requests before arrival of the response corresponding to the previous HTTP request. When the server is compatible with the pipelining, the following HTTP requests are queued on the server side, and are sequentially processed, and then the HTTP responses are returned.

As described above, the HTTP pipelining is able to send the next request without awaiting the response, but the sequence of the responses is the same as that of the requests. The reason is that it is difficult to simultaneously treat information pieces for different requests in a single TCP. For this reason, a problem arises in that, for example, if it takes time to process a single request, it also takes time to respond other requests each of which originally takes a short time to process.

Figure 8:
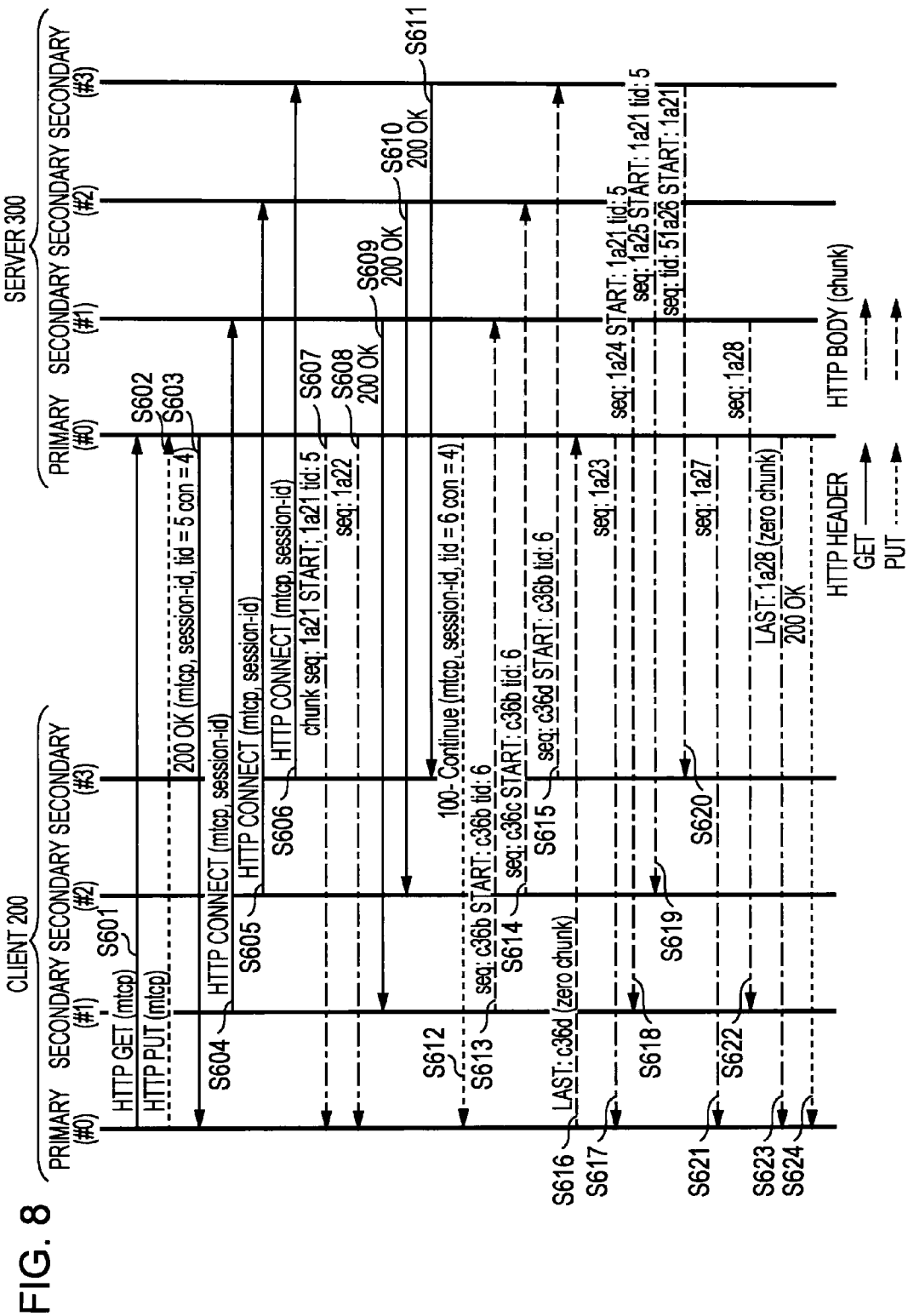
FIG. 8 is a sequence diagram illustrating a data communication method (pipelining) in a case where the client device transmits the GET request to the server device and further transmits the PUT request before acquiring the response from the server device.

FIG. 8 is a sequence diagram illustrating a data communication method (pipelining) in a case where the client device transmits the GET request to the server device and further transmits the PUT request before acquiring the response from the server device.

In the drawing, each solid-line arrow represents communication (download) between the client side parallel communication section 201 and the server side parallel communication section 301 through the client side communication section 204 and the server side communication section 304. Each chain-line arrow in the drawing represents communication (download) between the client side collective communication section 202 and the server side distributed communication section 303 through the client side communication section 204 and the server side communication section 304. Each dotted-line arrow represents communication (upload) between the client side parallel communication section 201 and the server side parallel communication section 301 through the client side communication section 204 and the server side communication section 304. Each dashed-line arrow in the drawing represents communication (upload) between the client side distributed communication section 203 and the server side collective communication section 302 through the client side communication section 204 and the server side communication section 304.

First, the client side parallel communication section 201 transmits the HTTP GET request to the server device 300 through the client side communication section 204 (step S601). The client side parallel communication section 201 transmits the HTTP PUT request to the server device 300 through the client side communication section 204 before acquiring the response to the HTTP GET request from the server device 300 (step S602).

In step S603 of this example, an example, in which "tid=5" is set in the HTTP response (200 OK), is shown. That is, it can be seen that the transaction is a fifth transaction ("tid=5"). Further, in steps S607, S608, and S617 to S622, "tid=5" is set in each chunk of the downloaded data.

On the other hand, in step S612 of this example, an example, in which "tid=6" is set in the HTTP response (100-Continue), is shown. That is, it can be seen that the transaction is a sixth transaction ("tid=6"). Further, in steps S613 to S615, "tid=6" is set in each chunk of the uploaded data.

Here, focusing on the communicated chunks, first, in steps S607 and S608, the chunks (tid=5) of a part of the download target data are downloaded. Next, in steps S613 to S616, all the chunks (tid=6) of the upload target data are uploaded. Finally, in steps S617 to S623, the remaining chunks (tid=5) of the download target data are downloaded. In the embodiment, it is not indispensable to perform data communication in the following order: all the chunks belonging to the download target data are downloaded, and then all the chunks belonging to the upload target data are uploaded.

In the embodiment, the transaction IDs (tid) are respectively assigned to the chunks. Thereby, when the reception side (in the case of upload, the server device 300, and in the case of download, the client device 200) refers to the transaction ID, it is possible to recover the data for each chunk having the same transaction ID (tid) regardless of the sequence of the data communication. For example, when downloading the plurality of pieces of data, the client device 200 is likely to receive chunks as data pieces, into which one data is divided, and chunks as data pieces, into which the other data is divided, in the sequence that they are mixed. Even in this case, the client device 200 is able to recover the plurality of pieces of data for each chunk having the same tid with reference to the tid for specifying each piece of the data.

In the embodiment, after the HTTP requests are pipelined, the transaction ID (tid) indicates which transaction (which request) the connection is used for. Thereby, in the related art, the headers of the HTTP responses should be returned in the sequence of the requests, but in the embodiment, it is possible to change the transmission sequence of the data or transmit and receive a plurality of contents in parallel as necessary.

Figure 9:
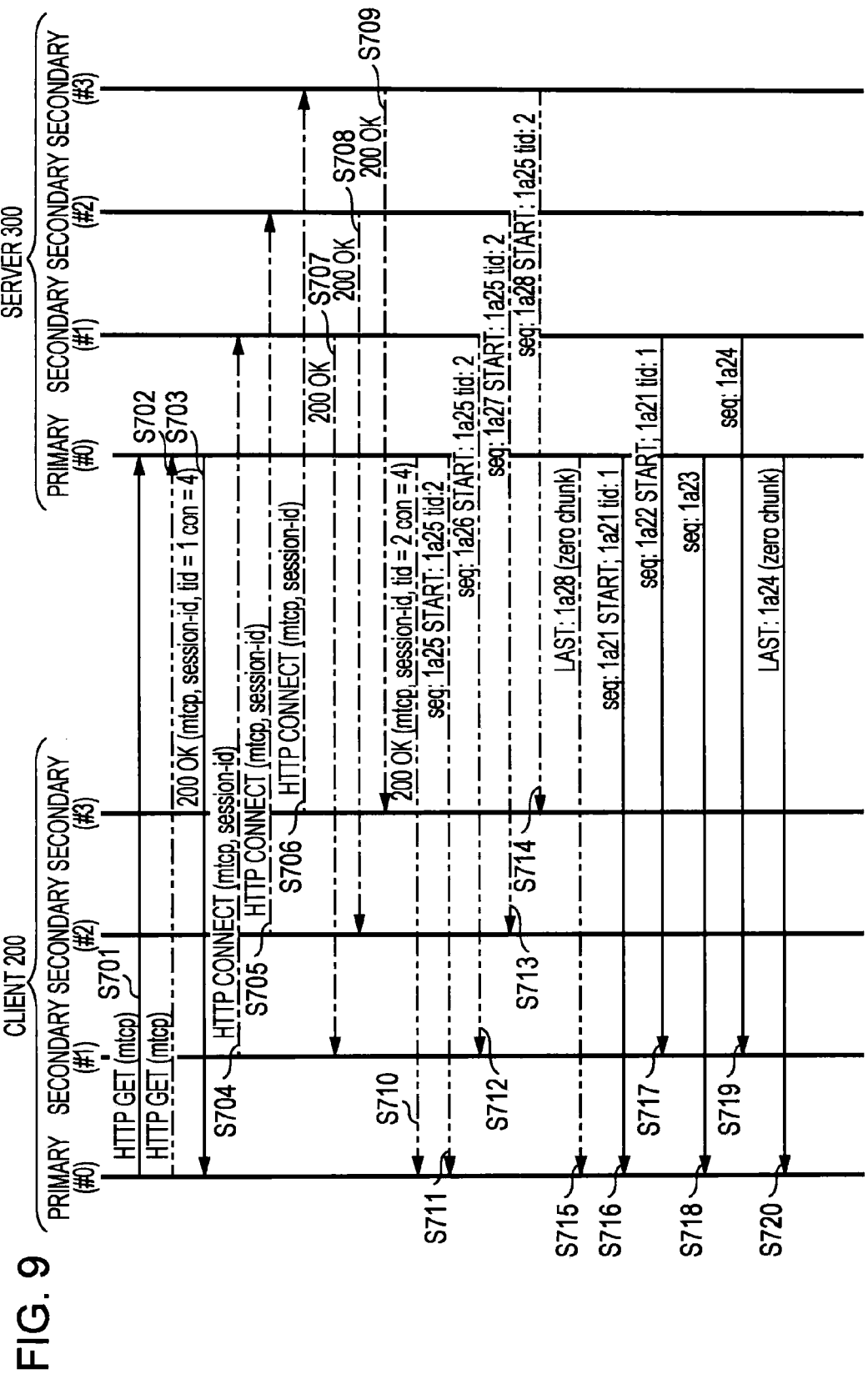
FIG. 9 is a sequence diagram illustrating a data communication method (pipelining) in a case where the client device transmits the GET request to the server device and further transmits separate GET request before acquiring the response from the server device.

7. Data Communication Method (Pipelining) in Case Where Client Device Transmits GET Request to Server Device and Further Transmits Separate GET Request Before Acquiring Response from Server Device FIG. 9 is a sequence diagram illustrating a data communication method (pipelining) in a case where the client device transmits the GET request to the server device and further transmits separate GET request before acquiring the response from the server device.

In the drawing, each solid-line arrow represents communication (download of certain data) between the client device 200 and the server device 300. Each chain-double-dashed-line arrow in the drawing represents communication (download of certain data) between the client device 200 and the server device 300. Each chain-line arrow represents processing of establishing the secondary connections.

First, the client side parallel communication section 201 transmits the first HTTP GET request (referred to as HTTP GET request 1) to the server device 300 through the client side communication section 204 (step S701). The client side parallel communication section 201 transmits the second HTTP GET request (referred to as HTTP GET request 2) to the server device 300 through the client side communication section 204 before acquiring the response to the HTTP GET request 1 from the server device 300 (step S702).

In step S703 of this example, an example, in which "tid=1" is set in the HTTP response (200 OK), is shown. That is, it can be seen that the transaction is a first transaction ("tid=1"). Further, in steps S716 to S720, "tid=1" is set in each chunk of the downloaded data.

On the other hand, in step S710 of this example, an example, in which "tid=2" is set in the HTTP response (200 OK), is shown. That is, it can be seen that the transaction is a second transaction ("tid=2"). Further, in steps S711 to S714, "tid=2" is set in each chunk of the downloaded data.

The HTTP responses (200 OK) are returned in the sequence of the HTTP GET requests. Accordingly, the client side parallel communication section 201 is able to verify which transaction ID is assigned to the HTTP GET request issued by itself, with reference to the header of the HTTP response (200 OK).

Here, focusing on the communicated chunks, first, in steps S711 to S715, the chunks (tid=2) of the download target data specified by the HTTP GET request 2 are downloaded. Next, in steps S716 to S720, the chunks (tid=1) of the download target data specified by the HTTP GET request 1 are downloaded. In the embodiment, it is not indispensable to perform data communication in the following order: the chunks belonging to the download target data specified by the HTTP GET request 1 are downloaded, and then the chunks belonging to the download target data specified by the HTTP GET request 2 are downloaded. In the embodiment, the transaction IDs (tid) are respectively assigned to the chunks. Therefore, when the client device 200 as the reception side refers to the transaction ID (tid), it is possible to recover the data for each chunk having the same transaction ID regardless of the sequence of the data communication.

More specifically, focusing on communication using the secondary connection #1, a description will be given. First, the client side collective communication section 202 receives the chunk of seq:1a26 start:1a25 tid:2 through the client side communication section 204 (step S712). The client side collective communication section 202 determines that the chunk is the second chunk of the HTTP GET request 2. Subsequently, the client side collective communication section 202 receives seq:1a22 start:1a21 tid:1 through the client side communication section 204 (step S717). The client side collective communication section 202 determines that the reception of the data (the chunks) relating to the HTTP GET request 2 through the secondary connection #1 is completed just before and the current chunk is the second chunk of the HTTP GET request 1.

In the embodiment, in order to indicate which request the sent data corresponds to, the tid, which represents which transaction the data sent through which connection is used for, is additionally written in the chunk. Thereby, after the HTTP requests are pipelined, the transaction ID (tid) indicates which transaction (which request) the connection is used for, whereby the reception side device is able to recover the data regardless of the sequence of the data communication. In such a manner, the transmission side device is able to change the sequence of the data transmission or send the plurality of contents in parallel as necessary.

8. Method (At the Time of Download) of Recovering Data from Unintentional Disconnection of TCP Connections Next, a description will be given of a case where some of the plurality of secondary connections are unintentionally disconnected due to a situation of the other side communication apparatus such as communication failure. In such a case, it is possible to maintain integrity of data in the following manner.

First, processing of the server device 300 will be described. When one or more secondary connections are disconnected, the server side distributed communication section 303 retransmits the chunks, which were present during the transmission using the disconnected secondary connections, to the client device 200 by sorting the other connections through the server side communication section 304. On the other hand, the client side collective communication section 202 refers to the "chunk-seq" of the chunk which is received through the client side communication section 204. The server side distributed communication section 303 may determine that the chunk fails to be transmitted and retransmit the same chunk. In this case, if bidirectional transmission is actually successful, the client side collective communication section 202 may redundantly acquire the same chunk. However, the client side collective communication section 202 is able to identify the redundant chunk by referring to the "chunk-seq" of each acquired chunk, and thus it is possible to ignore one of the chunks which are redundantly acquired.

Next, processing of the client device 200 will be described. When one or more secondary connections are disconnected, the client side parallel communication section 201 specifies the Session id the same as the first Session id and reestablishes the secondary connections by using HTTP CONNECT unless it exceeds the upper limit of the number of connections which can be allowed to be established. When the chunks were present during the transmission using the disconnected connections, it is expected to retransmit the chunks by using any one of the connections including the secondary connection which is newly established by the server device 300. As described above, the client side collective communication section 202 is able to detect the redundant chunk by referring to the "chunk-seq" of each chunk. In a case of no transmission, it is possible to solve the above problem by reissuing the HTTP GET request and specifying only the position of the missing chunk through the Range header. In addition, through the above-mentioned pipelining processing, the client side parallel communication section 201 is able to transmit a complementary HTTP GET request in parallel through the client side communication section 204 even before the original HTTP GET request ends.

9. Method (At the Time of Upload) of Recovering Data from Unintentional Disconnection of TCP Connections First, processing of the client device 200 will be described. When one or more secondary connections are disconnected, the client side parallel communication section 201 specifies the Session id the same as the first Session id and reestablishes the secondary connections by using HTTP CONNECT unless it exceeds the upper limit of the number of connections which can be allowed to be established. When the chunks were present during the transmission using the disconnected connections, the client side distributed communication section 203 retransmits the chunks by using any one of the connections including the secondary connection, which is newly established, through the client side communication section 204. The server side collective communication section 302 is able to identify the redundant chunk by referring to the "chunk-seq" of each acquired chunk, and thus it is possible to ignore one of the chunks which are redundantly acquired.

Next, processing of the server device 300 will be described. Even when one or more secondary connections are disconnected, the server side collective communication section 302 keeps receiving data as it is through the server side communication section 304 by using the remaining connections. When the chunks were present during the transmission using the disconnected connections, it is expected to retransmit the chunks by using the remaining connections through the client device 200. The server side collective communication section 302 is able to identify the redundant chunk by referring to the "chunk-seq" of each acquired chunk, and thus it is possible to ignore one of the chunks which are redundantly acquired. When there is loss in the data (the chunks) at the time of receiving the zero chunk, the server side collective communication section 302 transmits an HTTP error to the client device 200 through the server side communication section 304.

Hardware Configuration of Client Device

Next, hardware configurations of the client device 200 and the server device 300 will be described.

Figure 10:
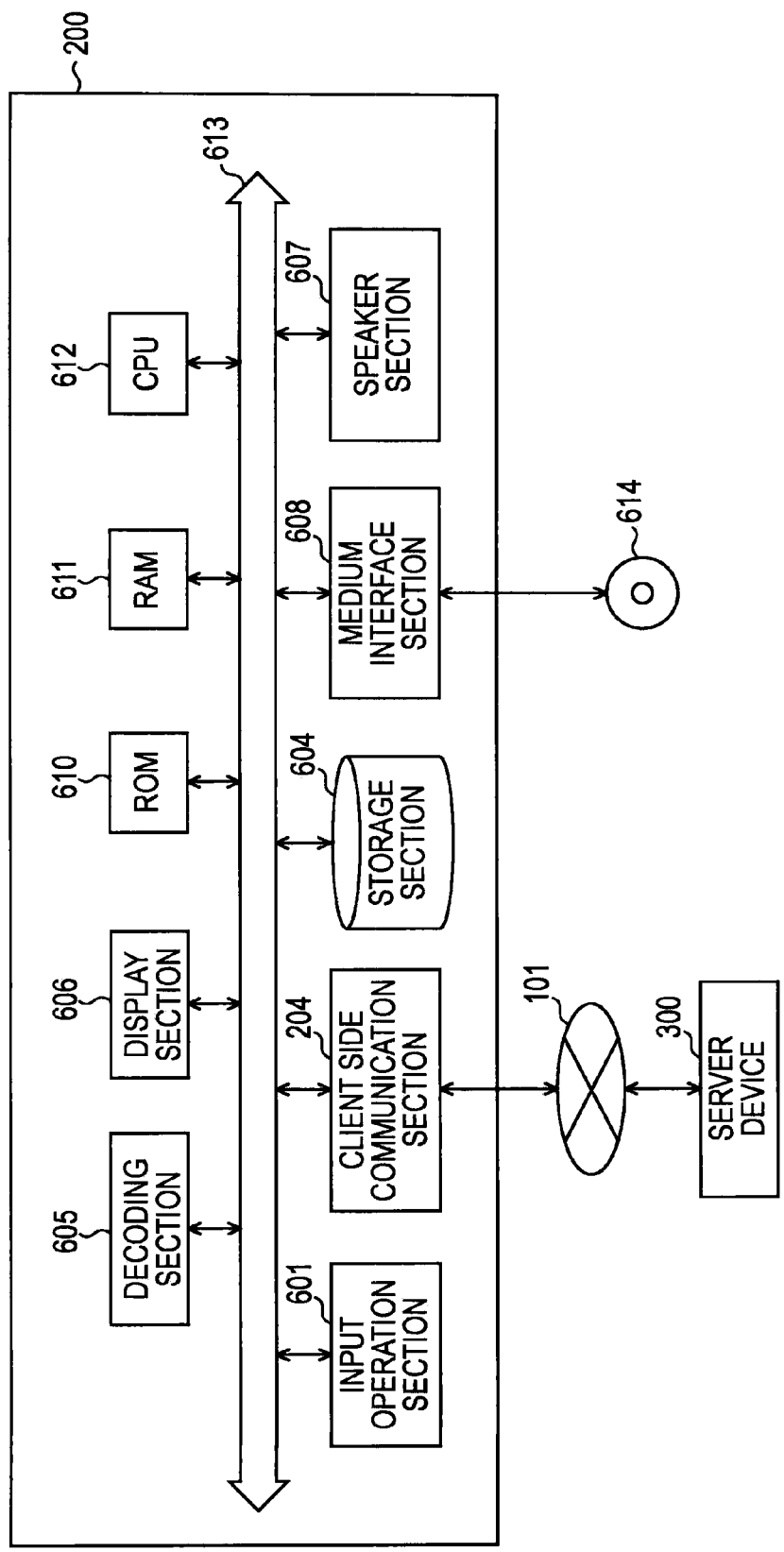
FIG. 10 is a block diagram illustrating a hardware configuration of the client device.

FIG. 10 is a block diagram illustrating a hardware configuration of the client device.

In the client device 200, a CPU (Central Processing Unit) 612 is connected to, through a system bus 613, an input operation section 601, the client side communication section 204, a storage section 604, a decoding section 605, a display section 606, a medium interface section 608, a ROM (Read Only Memory) 610, and a RAM (Random Access Memory) 611.

The input operation section 601 has various keys. A user inputs various commands or data by using the input operation section 601. The various commands, which are input from the input operation section 601 by the user, are supplied to the CPU 612 through the system bus 613.

The client side communication section 204 handles connection with the global network 101.

The storage section 604 is formed as HDD, SSD, or the like. The data of contents, which is downloaded through the network 101 by the client side communication section 204, is recorded in the storage section 604.

The decoding section 605 decodes the data of the contents which is read from the storage section 604, and recovers digital video data and digital audio data. The recovered digital video data is supplied to the display section 606 through the system bus 613, and the digital audio data is supplied to the speaker section 607 through the system bus 613.

The display section 606 includes, for example, a display unit having a display screen such as LCD (Liquid Crystal Display), a display control circuit that drives the display unit, and the like. The display section 606 displays an instruction which is input from a user, confirmation of data, various statuses, and the like.

The medium interface section 608 is able to be equipped with the removable medium 614 such as an optical disc, and is able to record the content data and the like in the removable medium 614. Examples of the removable medium 614 include recordable DVD, rewritable DVD, blu-ray disc, and the like.

The ROM 610 is a read only memory in which a program, data, and the like for software processing to be executed by the client device 200 are permanently stored. In addition, the program may be stored in the storage section 604.

The RAM 611 is a writable volatile memory which is used to load programs and codes which are executed by the CPU 612 or to write work data of the programs.

The CPU 612 collectively performs control of the respective sections of the client device 200 and controls interchange of data between the respective sections. The CPU 612 loads the program, which is necessary to execute the software processing through the client device 200, from the ROM 610 to the RAM 611, and execute the program through analysis thereof.

As described above, the client device 200 is configured by using typical computer hardware. In addition, the program stored in the ROM 610 makes the computer hardware of the client device 200 function as the respective modules shown in FIG. 2.

Hardware Configuration of Server device

Figure 11:
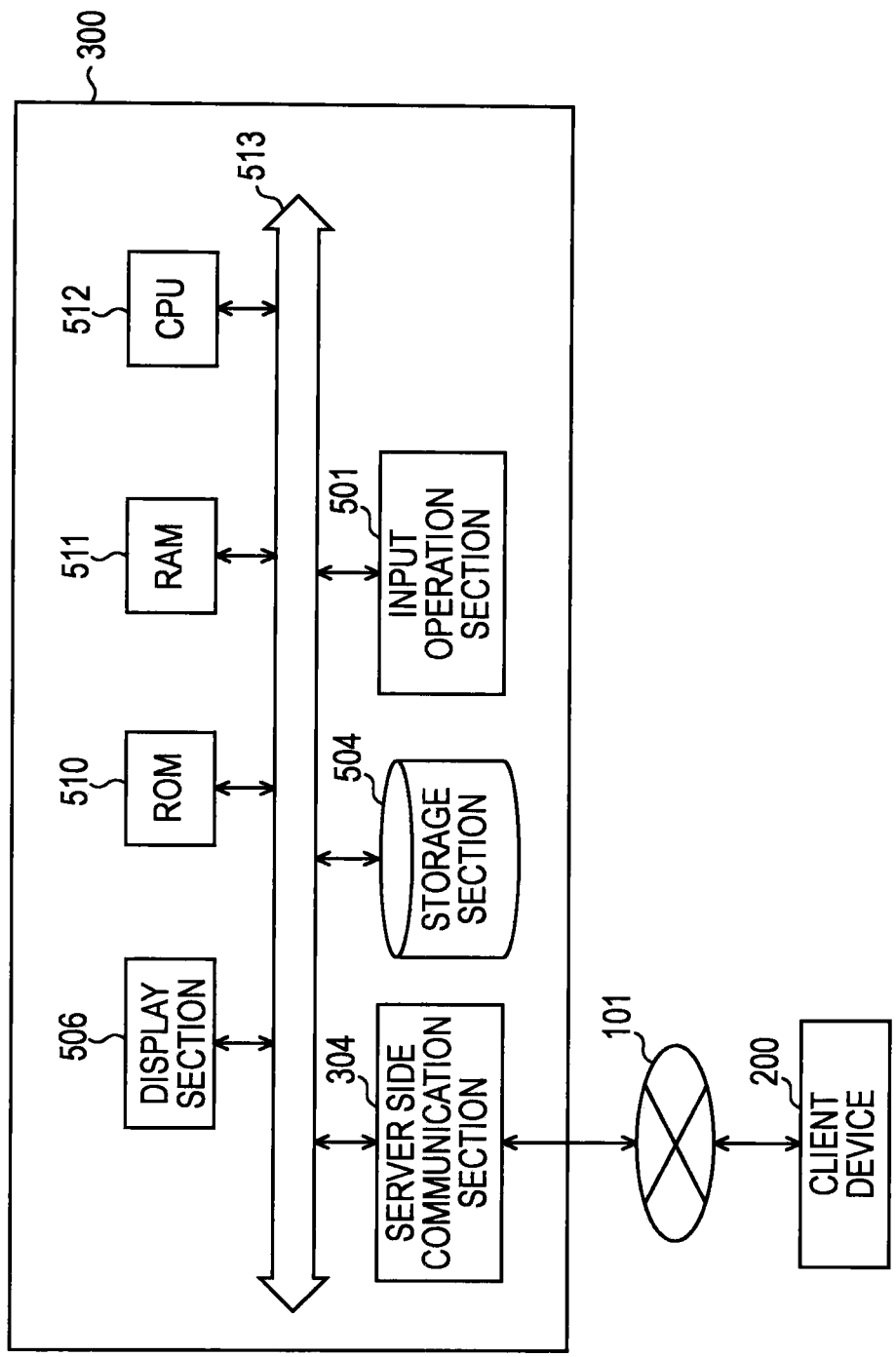
FIG. 11 is a block diagram illustrating a hardware configuration of the server device.

FIG. 11 is a block diagram illustrating a hardware configuration of the server device.

In the server device 300, a CPU (Central Processing Unit) 512 is connected to, through a system bus 513, an input operation section 501, the server side communication section 304, a storage section 504, a display section 506, a ROM (Read Only Memory) 510, and a RAM (Random Access Memory) 511.

The input operation section 501 has various keys. A server administrator inputs various commands or data by using the input operation section 501. The various commands, which are input from the input operation section 501 by the server administrator, are supplied to the CPU 512 through the system bus 513.

The server side communication section 304 (the network connection section) handles connection with the global network 101.

The storage section 504 is formed as HDD, SSD, or the like. The data of contents, which is uploaded through the network 101 by the server side communication section 304, is recorded in the storage section 504.

The display section 506 includes, for example, a display unit having a display screen such as LCD (Liquid Crystal Display), a display control circuit that drives the display unit, and the like. The display section 506 displays an instruction which is input from a user, confirmation of data, various statuses, and the like.

A medium interface section 508 is able to be equipped with the removable medium 614 such as an optical disc. Examples of the removable medium 614 include recordable DVD, rewritable DVD, blu-ray disc, and the like.

The ROM 510 is a read only memory in which a program, data, and the like for software processing to be executed by the server device 300 are permanently stored. In addition, the program may be stored in the storage section 504.

The RAM 511 is a writable volatile memory which is used to load programs and codes which are executed by the CPU 512 or to write work data of the programs.

The CPU 512 collectively performs control of the respective sections of the server device 300 and controls interchange of data between the respective sections. The CPU 512 loads the program, which is necessary to execute the software processing through the server device 300, from the ROM 510 to the RAM 511, and executes the program through analysis thereof.

The program stored in the ROM 510 makes the computer hardware of the server device 300 function as the respective modules shown in FIG. 2.

The present disclosure contains subject matter related to that disclosed in Japanese Priority Patent Application JP 2010-240691 filed in the Japan Patent Office on Oct. 27, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A data communication method comprising:
   in a first information processing device:
      establishing a plurality of TCP (Transmission Control Protocol) connections, between the first information processing device and a second information processing device, based on a speed of streaming of content;
      communicating each piece of data in the content, which is divided for each prescribed unit, to the second information processing device through the plurality of established TCP connections; and
   dynamically changing a number of the plurality of established TCP connections, based on the speed of streaming of the content, by notifying connection-upper-limit information, which represents an upper limit of the number of the plurality of TCP connections to be established with the second information processing device, to the second information processing device, and by changing the connection-upper-limit information to be notified.

2. The data communication method according to claim 1, further comprising:
   sequentially updating command sequence information in accordance with the change of the connection-upper-limit information; and
   transmitting the updated command sequence information to the second information processing device, wherein the second information processing device recognizes the changed connection-upper-limit information received from the first information processing device on the basis of the received updated command sequence information.

3. The data communication method according to claim 2, further comprising:
   adding the connection-upper-limit information and the command sequence information to a header of each piece of the divided data; and
   transmitting the added connection-upper-limit information and the command sequence information to the second information processing device.

4. The data communication method according to claim 3, further comprising:
   receiving a transmission request, which includes data specification information for specifying the data, from the second information processing device; and
   dividing the data, which is specified by the data specification information included in the received transmission request, into pieces for each prescribed unit;

adding the data specification information to the header of each piece of the divided data; and transmitting the divided data to the second information processing device.

5. The data communication method according to claim 4, further comprising:

adding context-identification information for identifying the context of data, which is not divided, to the header of each piece of the divided data, wherein the context-identification information comprises a sequence number of each piece of the divided data for identifying positional relationship of each piece of the divided data in the data which is not divided.

6. An information processing device comprising:

a Central Processing Unit (CPU) operable to:

establish a plurality of TCP (Transmission Control Protocol) connections with a different information processing device, based on a speed of streaming of content;

communicate each piece of data in the content, which is divided for each prescribed unit, to the different information processing device through the plurality of established TCP connections; and dynamically change a number of the plurality of established TCP connections, based on the speed of streaming of the content, by notifying connection-upper-limit information, which represents an upper limit of the number of the plurality of TCP connections to be established with the different information processing device, to the different information processing device, and by changing the connection-upper-limit information to be notified.

7. The information processing device of claim 6, wherein the CPU is operable to:

sequentially update command sequence information in accordance with the change of the connection-upper-limit information, and transmit the updated command sequence information to the different information processing device, wherein the different information processing device recognizes the changed connection-upper-limit information received from the information processing device on the basis of the received updated command sequence information.

8. The information processing device of claim 7, wherein the CPU is operable to:

add the connection-upper-limit information and the command sequence information to a header of each piece of the divided data, and transmit the added connection-upper-limit information and the command sequence information to the different information processing device.

9. The information processing device of claim 8, wherein the CPU is operable to receive:

a transmission request, which includes data specification information for specifying the data, from the different information processing device, and divide the data, which is specified by the data specification information included in the received transmission request, into pieces for each prescribed unit, add the data specification information to the header of each piece of the divided data, and transmit the divided data to the different information processing device.

10. The information processing device of claim 9, wherein the CPU is operable to add context-identification information for identifying the context of data which is not divided, to the header of each piece of the divided data, wherein the context-identification information comprises a sequence number of each piece of the divided data for identifying positional relationship of each piece of the divided data in the data which is not divided.

* * * * *